United States Patent [19]

Nakagawa et al.

[11] 4,433,338
[45] Feb. 21, 1984

[54] MULTIPLE-COLOR RECORDING APPARATUS

[75] Inventors: Shuichi Nakagawa; Sadao Tamura; Setsuo Satoh; Mamoru Sanagi; Hirosho Otsu; Shigenobu Miyamoto; Hiroyuki Takahashi, all of Tokyo, Japan

[73] Assignee: Yokogawa Hokushin Electric Corporation, Tokyo, Japan

[21] Appl. No.: 355,783

[22] Filed: Mar. 8, 1982

[30] Foreign Application Priority Data

Mar. 31, 1981 [JP] Japan .............................. 56-45896[U]
May 22, 1981 [JP] Japan .................................. 56-77734

[51] Int. Cl.³ .............................................. G01D 9/32
[52] U.S. Cl. ........................................ 346/34; 346/46
[58] Field of Search ..................... 346/46, 34, 35, 49, 346/75; 400/124, 240.4, 224.1, 224.2

[56] References Cited

U.S. PATENT DOCUMENTS

| | | | |
|---|---|---|---|
| 3,623,124 | 11/1971 | Platz | 346/46 |
| 4,178,597 | 12/1979 | Isayama et al. | 346/46 |
| 4,223,323 | 9/1980 | Bader et al. | 346/140 PD |
| 4,243,330 | 1/1981 | Wallace et al. | 400/124 |
| 4,313,684 | 2/1982 | Tazaki et al. | 346/75 |

OTHER PUBLICATIONS

Meier, J. H., vol. 21, No. 11, Apr. 1979, pp. 4448–4451, *IBM Technical Disclosure Bulletin*, Multicolor Matrix Impact Printer.

*Primary Examiner*—E. A. Goldberg
*Assistant Examiner*—Todd E. DeBoer
*Attorney, Agent, or Firm*—Moonray Kojima

[57] ABSTRACT

A multiple color recording apparatus records on a sheet of recording paper, the magnitudes of a plurality of varying analog signals as a pattern of dots in different colors, and also records characters, symbols and the like related to the analog recording as a pattern of dots in desired colors.

4 Claims, 7 Drawing Figures

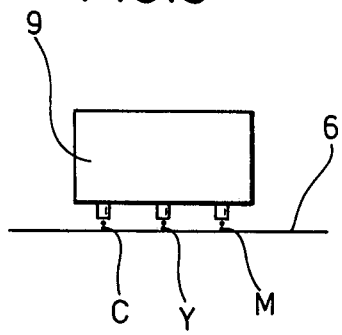
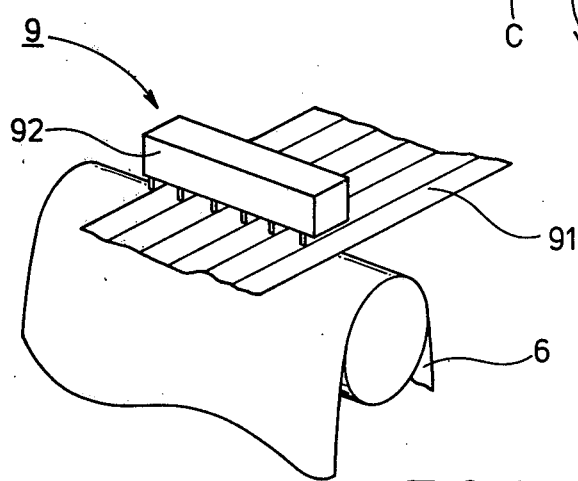
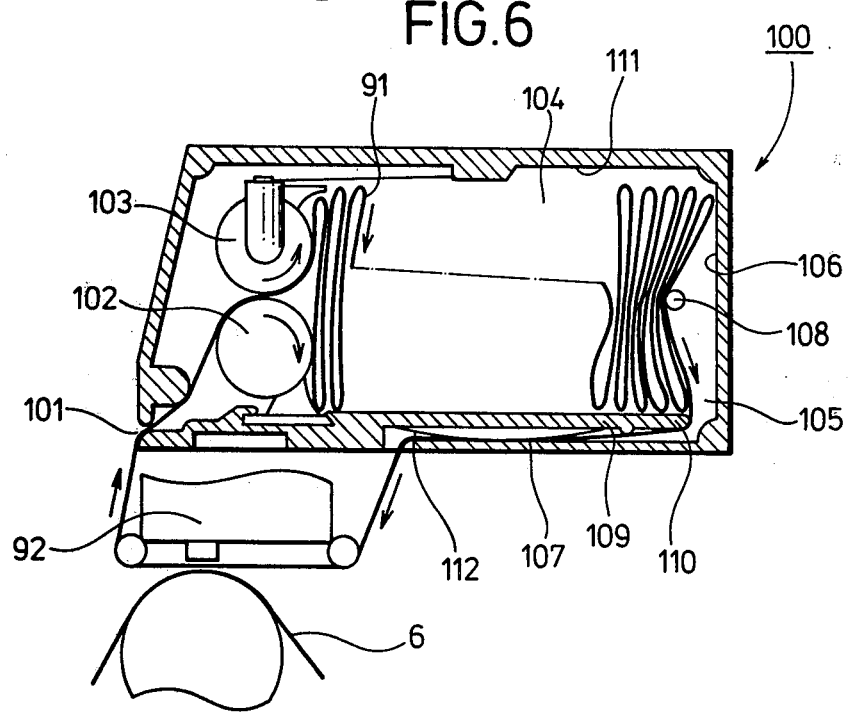

MULTIPLE-COLOR RECORDING APPARATUS

BACKGROUND OF THE INVENTION

1. Field of the Invention

This invention relates to a multiple-color recording apparatus for recording on a sheet of recording paper, the magnitudes of a plurality of varying analog signals as a pattern of dots in different colors, and also for recording characters, symbols and the like related to the analog recording as a pattern of dots in desired colors.

2. Description of the Prior art

Recording apparatus of the automatic balancing type for striking dots have heretofore been generally used to record the magnitudes of a plurality of analog input signals. The prior apparatus have an input switch for successively selecting the input signals to effect automatic balancing operation and dot striking recording. The known arrangements require a substantial amount of time (for example, several seconds) to record one dot and hence are not suitable for recording high speed operations. A complex mechanism would need to be added to include a function for skipping portions to be unrecorded, resulting in a complicated overall construction. Printing characters, symbols and the like related to the recording would require a mechanism for carrying out such printing.

The foregoing problems experienced with conventional dot striking recording apparatus of the automatic balancing type have allegedly been solved by a recording apparatus disclosed in U.S. Pat. No. 4,074,273 issued on Feb. 14, 1978 to Wayne P. Dupree, et al. The recording apparatus disclosed in that patent has a thermal head, movable to sweep in a direction normal to the direction of feed of a sheet of thermosensitive recording paper, for recording analog data with dots in the order of magnitudes of the data on the recording sheet and also for recording characters, symbols and the like related to the analog recording as a pattern of thermally printed dots. Printed data recording by the thermal dot printer are available only in a single color, and hence could not be identified clearly in the event the recordings crossed each other or were too crowded.

Thus, there is still a deficiency in the art in this particular technical area.

SUMMARY OF THE INVENTION

Accordingly, an object of the invention is to overcome the aforementioned and other deficiencies and disadvantages of the prior art.

Another object is to allow recorded data to be more easily identified by printing the data in multiple colors.

A further object is to provide a multiple color recording apparatus which can easily be maintained and which can record data more inexpensively.

Still another object is to provide a multiple color recording apparatus for printing data in multiple colors and at high speeds.

The foregoing and other objects are attained by the invention which encompasses a multiple color recording apparatus comprising an input switching mechanism for successively selecting and delivering a plurality of analog input signals; a signal converter for converting the analog input signals delivered from the input switching mechanism into digital signals; a first memory for temporarily storing the digital signals supplied from the signal converter; a paper feed mechanism for feeding a sheet of recording paper; a recording head for recording dots in multiple colors on the sheet of recording paper, a head scanning mechanism for scanning the recording head; a second memory for temporarily storing a digital signal related to the position of the recording head; and a processing unit, operable on a predetermined program, for reading all data out of the first memory and data out of the second memory, and for detecting selected data out of the data stored in the first memory which has a minimum difference with the data stored in the second memory, and for moving the recording head along the direction of scanning by a selected space interval, in response to the minimum difference, and for enabling the recording head to print dots on the sheet of recording paper when the minimum difference falls to zero.

The recording head may comprise an ink ribbon feeding mechanism for feeding an ink ribbon having strips of multiple colors along the direction of travel of the sheet of recording paper, and a dot striking mechanism having an array of dot striking pins arranged along a direction transverse (i.e. across) to the direction of travel of the sheet of recording paper and corresponding positionally to the plurality of strips of multiple colors. The dot striking pins are selectively actuatable for transferring desired colors from the ink ribbon to the sheet of recording paper. As an alternative, the recording head may comprise an ink jet head for ejecting droplets of ink in three primary colors spaced at intervals along the direction in which the recording head is movable.

The above and other objects, features and advantages of the present invention will become more apparent from the following detailed description, when taken in conjunction with the accompanying drawings in which certain preferred embodiments are shown by way of illustration.

BRIEF DESCRIPTION OF THE DRAWINGS

FIGS. 3 and 4 are diagrammatic views of recording heads employed in the invention.

FIG. 6 is a cross sectional view of a casing of the recording head of FIG. 5, wherein an ink ribbon may be stored.

DETAILED DESCRIPTION OF THE PREFERED EMBODIMENTS

Figure 1:
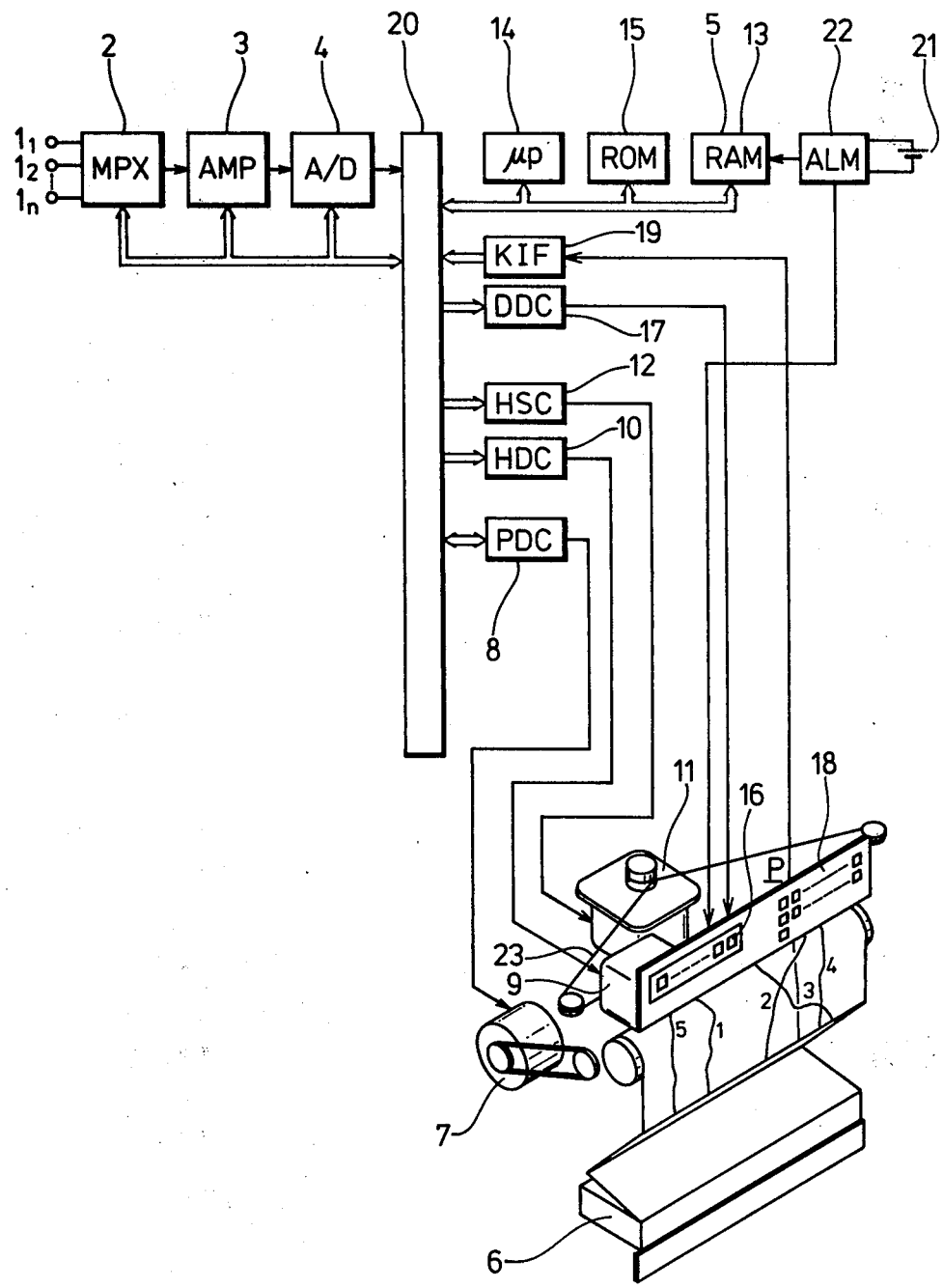
FIG. 1 is a diagrammatic view of one embodiment illustrative of the invention.
Figure 2:
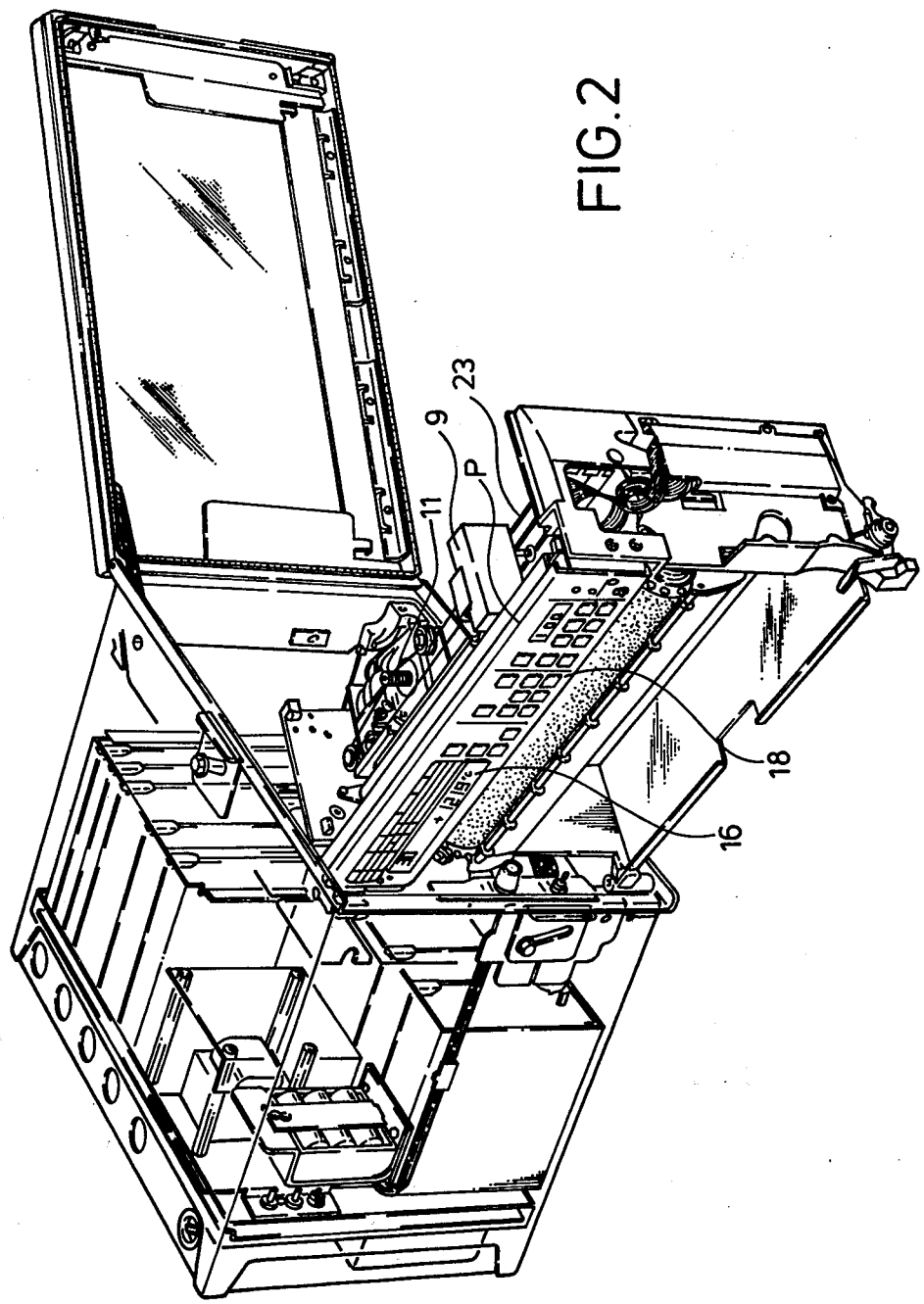
FIG. 2 is a perspective view of the illustrative embodiment of FIG. 1.

FIG. 1 shows a multiple color recording apparatus comprising input terminals $1_1 \ldots 1_n$ to which analog input signals are supplied; an input switching mechanism or multiplexer 2 for successively selecting and delivering the input analog signals fed from input terminals $1_1 \ldots 1_n$; an amplifier 3 for amplifying the selected input analog signals to a certain degree according to a set range of the apparatus; a signal converter or A/D converter 4 for converting the amplified analog signal into a corresponding digital signal; a first memory 5 for temporarily storing the output signal from the signal converter 4; a paper feed mechanism 7 having a pulse type motor, for example, for feeding a sheet of recording paper 6; a circuit 8 for driving the paper feed mechanism 7; and a recording head 9 for printing dots in multiple colors on the recording sheet of paper 6 in response to the input signals as selected. The recording apparatus also includes a circuit 10 for driving the recording head 9; a head scanner 11 having a pulse type motor, for example, for scanning the recording head 9 in a direction normal to the direction of travel of the sheet of recording paper 6; a scanning circuit 12 for issuing a signal for driving the head scanner 11 and issuing a digital signal related to the position of the recording head 9; a second memory 13 for temporarily storing the digital signal delivered from the scanning circuit 12; a processing unit 14 such as a microprocessor; a memory 15 for storing characters, symbols and the like as dot patterns and also storing data concerning the sequence of operations of the recording apparatus; a display unit 16 for displaying information related to measurements; a circuit 17 for driving the display unit 16; a keyboard 18 for setting modes of operation of the recording apparatus, kinds of input signals, recording ranges, alarm settings, speeds of travel of the recording paper, and the like; an interface 19 for the keyboard 18; an input/output port 20; a battery 21 for backing up the memory units 5 and 13; an alarm circuit 22 for detecting any voltage drop in the battery 21; a driving string 23; and a panel P. Although not shown, an end detecting means may be disposed at least at one end of an area which the recording head 9 scans, for generating an end signal in response to arrival of recording head 9 at the end detecting means, to reset data indicative of the position of the recording head 9.

The recording apparatus thus described is operable as follows. The analog signals fed to input terminals $1_1$ . . . $1_n$ are successively selected, for example, at a period of 0.2 second per each dot by input switching mechanism 2 controlled by processing unit 14, and are supplied to amplifier 3. Amplifier 3, which may be a programmable gain amplifier, for example, is controlled by processing unit 14 so as to co-act with input switching mechanism 2, such that the magnitudes of the analog input signals, as amplified, will fall within a certain range. The amplified signals are converted into digital signals by signal converter 4, and then temporarily stored in first memory 5. The stored data are linearized, dependent on the kind of inputs, and stored as signals for being displayed, and also are converted into numerical values ranging, for example, from 0 to 2,500 corresponding to the width of 250 mm divided into increments of 0.1 mm so as to be recorded, and stored as such numerical value. Input switching mechanism 2, amplifier 3, and signal converter 4 jointly constitute an analog processing section, which is connected to a digital processing section through a photocoupler that serves to insulate the digital processing section from the analog processing section.

The sheet of recording paper 6, is caused by paper feed mechanism 7 controlled by processing unit 14, to travel intermittenly stepwise each time recording head 9 is scanned. Recording paper 6 may comprise plain paper which is not specially treated.

Recording head 9 may comprise an ink jet head, wire dot head, or the like. Where recording head 9 is an ink jet head, it is constructed in an manner that it will eject droplets of ink in three primary colors (e.g. cyan C, magenta M, yellow Y) spaced at intervals along the direction of travel of recording head 9, as illustrated in FIG. 3. Where recording head 9 is a wire dot head, it comprises, as shown in FIG. 4, an ink ribbon 91 which can travel along the direction of feed of the sheet of recording paper 6 and which has a plurality of strips dyed in multiple colors extending along the direction of travel of the ink ribbon 91, and a dot striking mechanism 92 having a plurality of dot striking pins arranged in an array across (i.e. transverse to) the direction of feed of the sheet of recording paper 6, and corresponding positionally to the strips of different colors of ink ribbon 91. The dot striking pins are selectively actuatable to transfer desired colors from the ink ribbon 91 to the sheet of recording paper 6.

Figure 5:
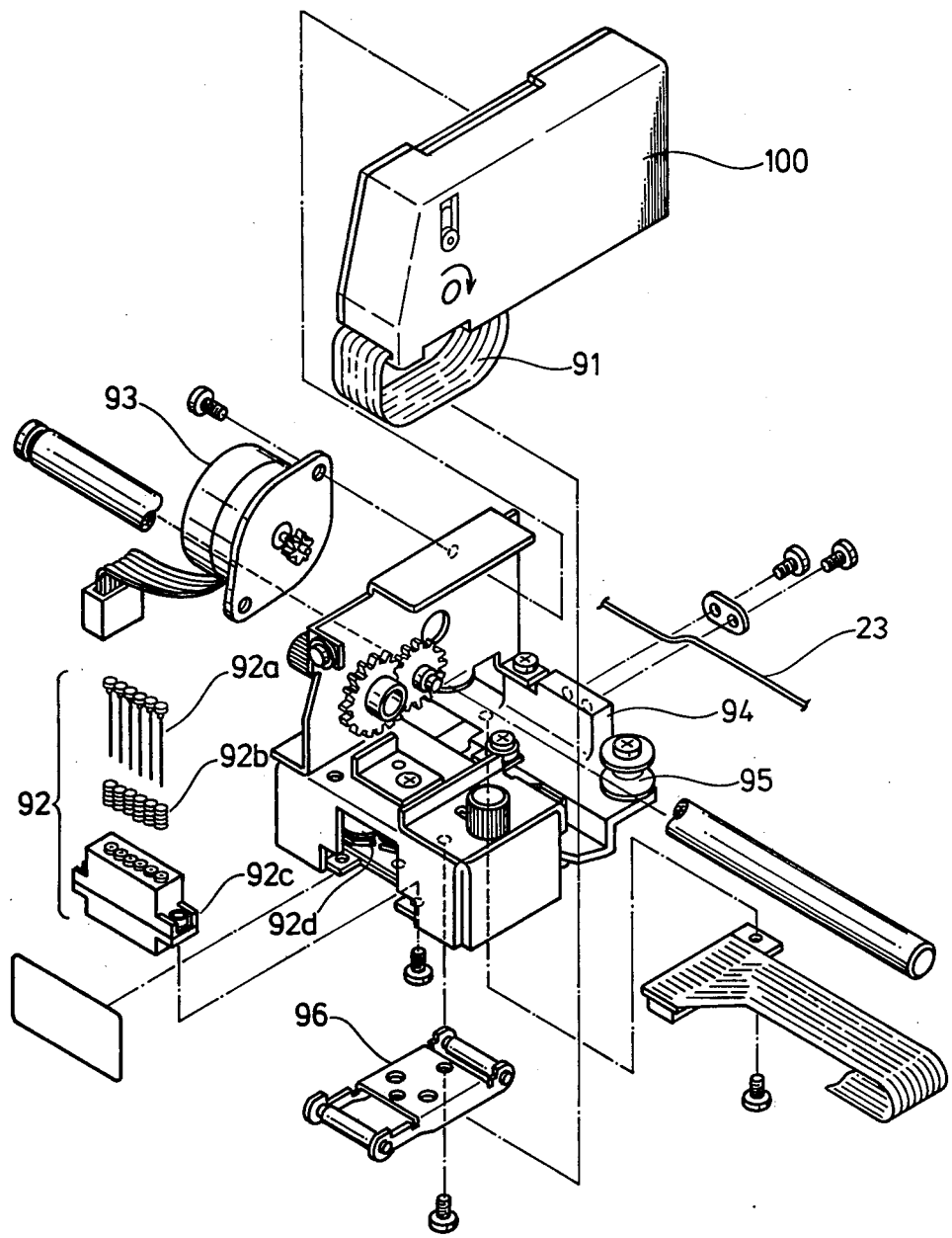
FIG. 5 is an exploded perspective view of the recording head of FIG. 4.

FIG. 5 illustrates in detail such a wire dot head, which comprises an array of dot striking pins 92a, a plurality of return springs 92b, and a holder 92c. Ink ribbon 91 is fed by a motor 93 mounted on an attachment base 94 which is guided by a guide roller 95 along the direction of travel thereof. Ink ribbon 91 is composed of an endless ink ribbon guided by a guide member 96 and housed in an ink ribbon casing 100. Attachment base 94 has therein six solenoids 92d for selectively energizing the dot striking pins 92a to move into holder 92c.

The ink ribbon casing 100 comprises, as illustrated in FIG. 6, an opening 101 for introducing therethrough the ink ribbon 91; feed rolls 102 and 103; a chamber 104 containing the ink ribbon 91; an opening 105 for discharging therethrough ink ribbon 91; a sidewall 106 disposed in confronting relation to feed rolls 102 and 103; an outlet passage 107 for ink ribbon 91; a cylindrical projection 108 disposed adjacent to sidewall 106 and having a height substantially equal to the width of ink ribbon 91; a sidewall 109 partially defining the outlet passage 107; an end 110 of the sidewall 109; a sidewall 111 contiguous to sidewall 106 and confronting sidewall 109; and a presser spring 112 fitted in outlet passage 107.

Ink ribbon 91 will move into and out of ink ribbon casing 100 in the following manner. The ink ribbon 91, which may be endless, is introduced by feed rolls 102,103 through introducing opening 101 into casing 100, wherein ink ribbon 91 is gathered into folds, as depicted. Feed rolls 102,103 may be rotated by motor 93 or may be driven by head scanner 11 in synchronization with movement of recording head 9. Ink ribbon 91 is discharged in an unfolded condition, through discharging opening 105, out of casing 100. More specifically, ink ribbon 91 is caused to be folded within casing chamber 104 by action of feed rolls 102, and 103, and is pressed against projection 108 which is adjacent to sidewall 106, as depicted. Projection 108 serves to tension ink ribbon 91 while the latter is unfolded and fed through discharge opening 105 and outlet passage 107, without getting jammed. Projection 108 also serves to allow ink ribbon 91, as folded, to be housed evenly within chamber 104. Projection 108 should preferably be located at a position more remote than end 110 of sidewall 109 from sidewall 106. If, however, projection 108 were spaced too far away from sidewall 106, folded ink ribbon 91 would tend to become entangled around projection 108 and casing chamber 104 would become too small. To prevent such difficulties, the distance between projection 108 and sidewall 106 should preferably be smaller than one half the folded length of ribbon 91, that is, the distance between sidewall 109 and sidewall 111. Projection 108 should be disposed centrally between sidewall 109 and sidewall 111, since, for example, if projection 108 were displaced off to either sidewall 109 or sidewall 111, ink ribbon 91 would be housed out of balance in casing chamber 104. With this arrangement, ink ribbon 91, as it is unfolded, is frictionally held against projection 108 so that ink ribbon 91 can be smoothly fed out through discharge opening 105 under frictional forces imposed by projection 108. Ink ribbon 91 is also put under tension by spring 112 in outlet passage 107 which is pressed against ink ribbon 91 as it passes through outlet passage 107 on the way out of ink ribbon casing 100.

While in the embodiment shown in FIG. 6, spring 112 is separate and is disposed in outlet passage 107, spring 112 may be dispensed with and the sidewall 109 may be arranged to provide resilient action to ink ribbon 91 while it goes through outlet passage 107. Projection 108 may be a separate member of a desired shape, which is attached to casing 100, or it may be formed integrally with casing 100. Alternatively, projection 108 may be integral with sidewall 106. Projection 108 may also be rendered rotatable. For example, another cylindrical member may be rotatably fitted over projection 108, or a member with a rotatable roller mounted thereon may be attached in place of projection 108. Such a rotatable projection 108 would tend to collect less dust while in operation.

Recording head 9 thus constructed is controlled by head scanner 11 (see FIG. 1) under control of processing unit 14 to effect raster scanning, for example, in increments of 0.1 mm stepwise in a direction normal to the direction of travel of the sheet of recording paper 6. The positions which recording head 9 takes are converted into digital signals, which are temporarily stored in second memory 13. Although in the illustrated arrangement (see FIG. 1) the first memory 5 and second memory 13 are shown sharing a common memory unit, they may be formed of separate memory units.

Processing unit 14 reads all data corresponding to the input signals temporarily stored in first memory 5 and data corresponding to the position of recording head 9 and temporarily stored in second memory 13, and detects selected data out of the data stored in first memory 5 which has a minimum difference with the data stored in second memory 13. Processing unit 14 causes recording head 9 to move along the scanning direction for a selected space interval, in response to such a minimum difference. When the minimum difference falls to zero, processing unit 14 issues a control signal to enable recording head 9 to print a dot in a color which corresponds to the selected input signals. The recording positions for these colors are compensated for during delivery of the control signals. Such compensations are effected by adding to or subtracting from the input signals temporarily stored in first memory 5, signals indicative of phase differences between a reference element and elements of recording head 9 which are assigned to the input terminals, respectively, to print data in different colors. Two or more colors may be mixed as desired in the printing operation. The foregoing operation is repeatedly carried out while recording head 9 is scanned once, to thereby print the magnitudes of the input signals with dots in given colors. Processing unit 14 also serves to control the printing of characters, symbols and the like stored in memory 15 onto the sheet of recording paper 6, the displaying operation of display unit 16, the changing of setting of parameters through keyboard 18, and other operations. The above operations are effected in accordance with a predetermined program in processing unit 14.

Figure 7:
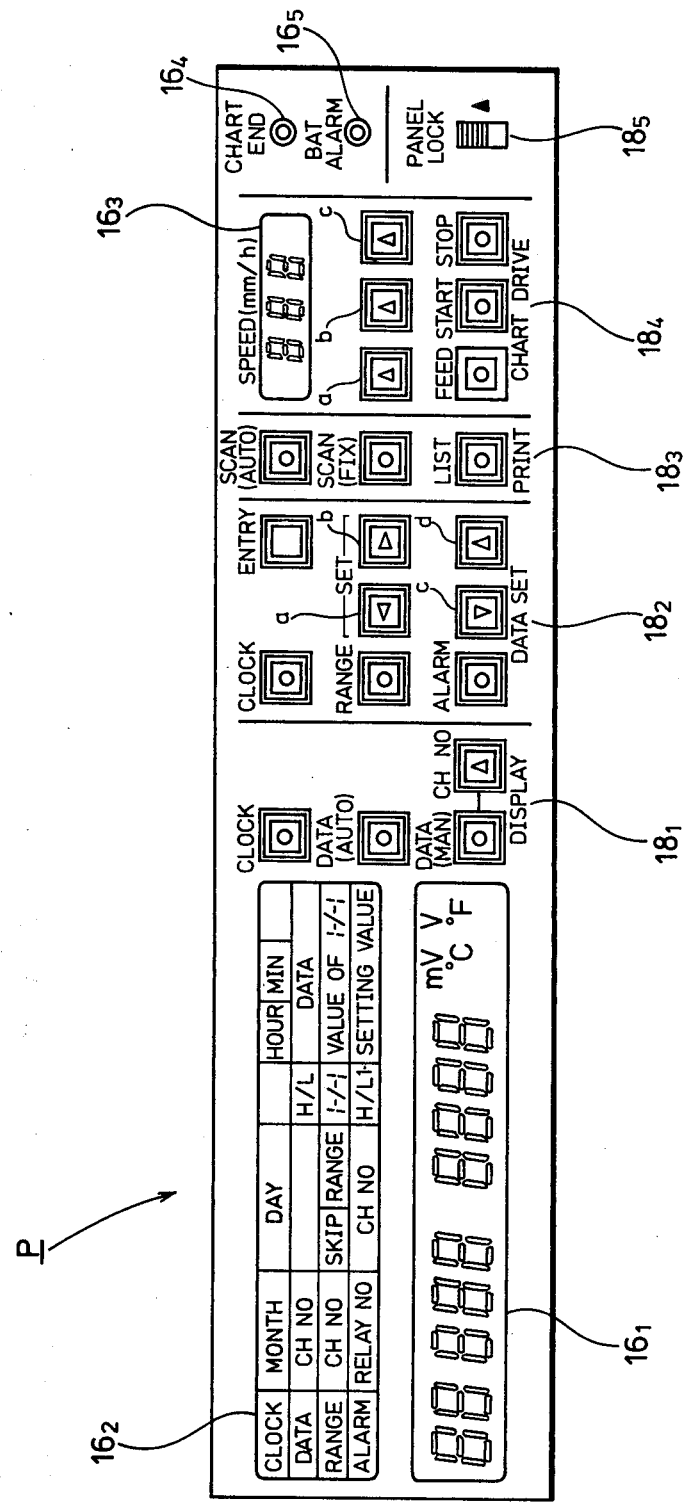
FIG. 7 is an enlarged front elevational view of a front panel of the embodiment of FIGS. 1 and 2.

Panel P, shown in an enlarged scale in FIG. 7, includes display unit 16, keyboard 18, and the like. Panel P has a display section $16_1$ including seven segment display elements for displaying date, hour, range, and alarm settings and index table $16_2$ for indicating the displayed data on display section $16_1$; a display section $16_3$ including seven segment elements for displaying the speed of travel of the sheet of recording paper; a lamp $16_4$ for indicating the end of the sheet of recording paper; a lamp $16_5$ for indicating a voltage drop of battery 21; a switch $18_1$ for changing display modes for the display section $16_1$; a switch $18_2$ for setting various parameters; a switch $18_3$ for setting recording modes; a switch $18_4$ for setting the speed of feed of the sheet of recording paper and changing modes of operation for feeding the sheet of recording paper; and a switch $18_5$ for temporarily fixing switches $18_1 \ldots 18_4$. Switches $18_1 \ldots 18_4$ include built-in lamps, respectively, which are energizable when the associated switches are actuated.

Display section $16_1$ displays "MONTH-DAY-HOUR-MIN" on the item "CLOCK" in index table $16_2$, when "CLOCK" in switch $18_1$ is actuated. It displays "CH NO.(channel number)-H/L (alarm condition)-DATA (magnitude of a measured signal)" on the item "DATA" in index table $16_2$ while the channels (30 channels at maximum according to the illustrative embodiment) are, for example automatically renewed every three seconds irrespective of the recording operation, when "DATA(AUTO)" in switch $18_1$ is actuated. It displays the contents on the item "DATA" in index table $16_2$ while data in a particular channel is renewed in response to actuation of "CH NO." of switch $18_1$, when "DATA(MAN)" in switch $18_1$ is actuated. Display section $16_1$ also displays parameter settings.

Display section $16_1$ further displays the contents on the item "CLOCK" in index table $16_2$ when "CLOCK" in switch $18_2$ is selected. It displays the contents on the "Range" in index table $16_2$ when "RANGE" in switch $18_2$ is selected. It displays the contents on item "ALARM" in index table $16_2$ when "ALARM" in switch $18_2$ is selected.

Switch $18_2$ contains four "SET" switches a,b,c,d for changing contents displayed in established modes. Switch a serves to shift designated figures to be changed on display section $16_1$ one figure at a time to the left. Switch b serves to shift such figures one figure at a time in the opposite direction. Switches c and d serve to reduce and increase, respectively, a numerical value in a designated figure one step at a time. "ENTRY" in switch $18_2$ causes the contents displayed in display section $16_1$ which are set by switches a,b,c,d to be temporarily stored in a memory. When the established content is permissible in each mode, the prior content is renewed. When the established content is not permissible, display section $16_1$ flickers as a whole to let the operator know that the setting is erroneous. In the setting modes, the designated figures are caused to be lighted at an intensity which is different from that of the other figures.

In the "RANGE" mode, display section $16_1$ displays "CH NO. (channel number)-SKIP (indicative of whether there is skipping or not)-RANGE (kind of range)"- ⊢/⊣ (indicative of a lefthand end or righthand end)-VALUE OF ⊢/⊣ (set value at the lefthand end or righthand end)". Complete skipping is indicated by "-", analog recording only is indicated by "A", and both analog and digital recording is indicated by "P". The kinds of ranges are indicated in 16 displays which range from "O" to "F". The setting at the lefthand end or righthand end may be of any desired value provided it falls within a zone determined by the range selected. In this "RANGE" mode, the channel numbers may be individually designated and set, or five groups from "AO" to "EO" each containing six channels may be designated and set for simultaneous setting of the channels in one group, or all the channels indicated as "OO" may be set as a whole. In the "ALARM" mode, display section $16_1$ displays "RELAY NO. (relay number)-CH NO. (channel number)-H/L (alarm setting condition)-SETTING VALUE (alarm setting)".

According to this embodiment, sixty relays may be combined as desired for the maximum thirty channels. In this mode, a desired alarm setting can be given to each relay for a desired channel. Where all of the channels are set for a common range, relays #1 . . . #30 may be controlled by "LO" to correspond to channels #1 . . . #30, and the relays #31 . . . #60 may be controlled by "HO" to correspond to channels #31 . . . #61, so that "LO" and "HO" can be set for an alarm setting common to all of the channels. "H" indicates an upper limit setting for the alarm. "L" indicates a lower limit setting for the alarm. "-" indicates no setting for the alarm. Individual display lamps and output terminals are provided, respectively, for the relays to indicate and deliver the outputs from the relays. Two additional display lamps are also provided which are energizable in response to operation of one relay in each group, and two additional output terminals are provided to deliver common output signals. These display lamps and output terminals may be constructed as a unit to be attached to the apparatus. Since alarm detecting operation is digitally effected after the outputsignal from amplifier 3 has been converted into a digital signal by signal converter 4 as shown in FIG. 1, the operation is stable with respect to a signal falling out of the recorded range on the sheet of recording paper 6 provided the alarm detection is within the operating range of amplifier 3.

Switch $18_3$ serves to set the recording modes. In the "SCAN (AUTO)" mode, the scanning interval of recording head 9 is automatically varied in response to the speed of the feeding of the sheet of recording paper 6, so that the density of recorded dots on recording paper 6 will become constant irrespective of changes in the speed of travel of the sheet of recording paper 6. In the "SCAN(FIX)" mode, the scanning interval of recording head 9 is kept constant, (for example 8 seconds) at all times for dot printing. In the "LIST" mode, "CLOCK" information and contents set in "ALARM" and "RANGE" are printed with dots according to predetermined formats. In this mode, the speed of feed of recording paper 6 and the scannin interval of recording head 9 are automatically set for suitable values. Digital recording on blanks at the ends of the sheet of recording paper 6 is carried out according to a predetermined program in the "SCAN" modes, except the "LIST" mode. "CLOCK" information and designated "DATA" information are recorded at certain intervals of time or at certain intervals through which the sheet of recording paper 6 is fed. When an alarm signal is generated, such fact is recorded on recording paper 6 at the time of occurence of the alarm signal.

The speed of travel of the sheet of recording paper 6 and the modes of operation are set by switch $18_4$. Switch $18_4$ includes three switches a,b,c which serve to change the setting for the figures in display section $16_3$ and can set each figure in the range of from "0" to "9". In the "STOP" mode, the feeding operation of the recording paper 6 is stopped. The "START" mode starts feeding recording paper 6. When the "FEED" mode is selected. recording paper 6 is fed rapidly irrespective of a set speed.

Switch $18_5$ serves, as described above, to fix temporarily, operation of switches $18_1$ . . . $18_4$ mounted on panel P. When switch $18_5$ is locked, all of the other switches are fixed as selected so that they are protected against inadvertent or accidental actuation.

With the arrangement of the present invention, the magnitudes of input signals supplied to the input terminals can be printed with dots in corresponding colors, and related characters, symbols and the like can also be recorded with dots in desired colors at high speeds while recording head 9 moves from one end to the other and back in the scanning zone.

The recording head is of a relatively simple structure. Where the recording head is capable of printing data with dots in different colors spaced at intervals along the direction of travel of the head, it can produce superimposed multiple colors at folds of recording paper 6.

No sliding mechanism is needed for feeding back signals of positions of the recording head, which will thus have a longer service life. Where the recording head comprises an ink jet head, no wear on the recording head is experienced, resulting in a prolonged operating life of the recording head. As ordinary plain paper can be used for recording paper 6, the cost of recording can be reduced.

Control of the operations of the apparatus can be programmed or set with digital signals by operating keyboard 18 to set alarm values, change measurement ranges and speeds of feed of recording paper, record characters and symbols, skip unwanted measuring points, and perform other functions, without adding special mechanisms. The apparatus is therefore of a greatly simplified construction.

While in the foregoing embodiment a pulse type motor is employed for the head scanner, the head scanner may comprise a combination of a synchronous motor or d.c. motor and an encoder. The recording head may be composed of a plurality of individual recording head units for printing dots respectively in multiple colors.

The multiple color recording apparatus according to the present invention is of highly practical advantage in that it is of a relatively simple structure, has a variety of functions, can print data with multiple dots in multiple colors stably at high speeds, can produce recorded data easily identifiable or legible, can be maintained with ease, and can record data less expensively.

Although certain preferred embodiments have been shown and described in detail, it should be understood that various changes and modifications may be made therein without departing from the spirit and scope of the appended claims.

What is claimed is:

1. A multiple color recording apparatus comprising an input switching mechanism for successively selecting and delivering a plurality of input analog signals;

a signal converter for converting said plurality of input analog signals into digital signals;

a first memory for temporarily storing said digital signals;

a paper feed mechanism for feeding and moving a sheet of recording paper;

a recording means for recording dots in multiple colors on said sheet of recording paper, said recording means comprising a plurality of recording elements arranged along a direction transverse to direction of travel of said recording paper for recording different colors of dots;

a head scanning mechanism for scanning said recording means;

a second memory for temporarily storing digital signal related to the position of said recording means; and a processing unit operable on a predetermined program for reading all data out of said first memory and data out of said second memory, said unit adapted to effect a phase correction by a phase difference signal related to a reference recording element of each of said recording elements for correcting the color dot recording position to a predetermined position allocated to each data stored in said first memory and thereupon detect selective data out of said phase corrected data stored in said first memory having a minimum difference with said data stored in said second memory, and for moving said recording means along the direction of scanning by a selected interval in response to said minimum difference and for enabling said recording means to print dots on said sheet of recording paper when said minimum difference falls to zero, thereby to produce analog recording of signal levels of a plurality of input analog signals in the form of a dot pattern of different colors allocated to said signals respectively.

2. The apparatus of claim 1, wherein said recording means further comprises a ribbon feeding mechanism for feeding an ink ribbon comprising a plurality of strips in multiple colors along said direction of travel of said sheet of recording paper, and a dot striking mechanism having an array of dot striking pins arranged along a direction transverse to said direction of travel of said sheet of recording paper and corresponding positionally to said plurality of strips in multiple colors, said dot striking pins being selectively actuable for transferring desired colors from said ink ribbon to said sheet of recording paper.

3. The apparatus of claim 2, wherein said ink ribbon comprises an endless ink ribbon.

4. The apparatus of claim 1, wherein said recording means comprises an ink jet head for ejecting ink dots in three primary colors spaced at intervals along said direction in which said recording means is movable.

* * * * *